June 16, 1953 F. P. GOHOREL 2,642,499

ROUTE-SELECTING AUTOMATIC TELEPHONE SYSTEM

Filed Oct. 8, 1947 3 Sheets-Sheet 1

INVENTOR.
FERNAND PIERRE GOHOREL
BY Robert Harding Jr.
ATTORNEY

June 16, 1953 F. P. GOHOREL 2,642,499

ROUTE-SELECTING AUTOMATIC TELEPHONE SYSTEM

Filed Oct. 8, 1947 3 Sheets-Sheet 2

INVENTOR.
FERNAND PIERRE GOHOREL

BY Robert Harding Jr.

ATTORNEY

ROUTE-SELECTING AUTOMATIC TELEPHONE SYSTEM

Filed Oct. 8, 1947 3 Sheets-Sheet 3

INVENTOR.
FERNAND PIERRE GOHOREL
BY Robert Harding Jr.
ATTORNEY

Patented June 16, 1953

2,642,499

UNITED STATES PATENT OFFICE 2,642,499

ROUTE-SELECTING AUTOMATIC TELEPHONE SYSTEM

Fernand P. Gohorel, Antony, France, assignor to International Standard Electric Corporation, New York, N. Y., a corporation of Delaware Application October 8, 1947, Serial No. 778,657
In France August 27, 1946

Section 1, Public Law 690, August 8, 1946
Patent expires August 27, 1966

11 Claims. (Cl. 179—18)

Figure 1:
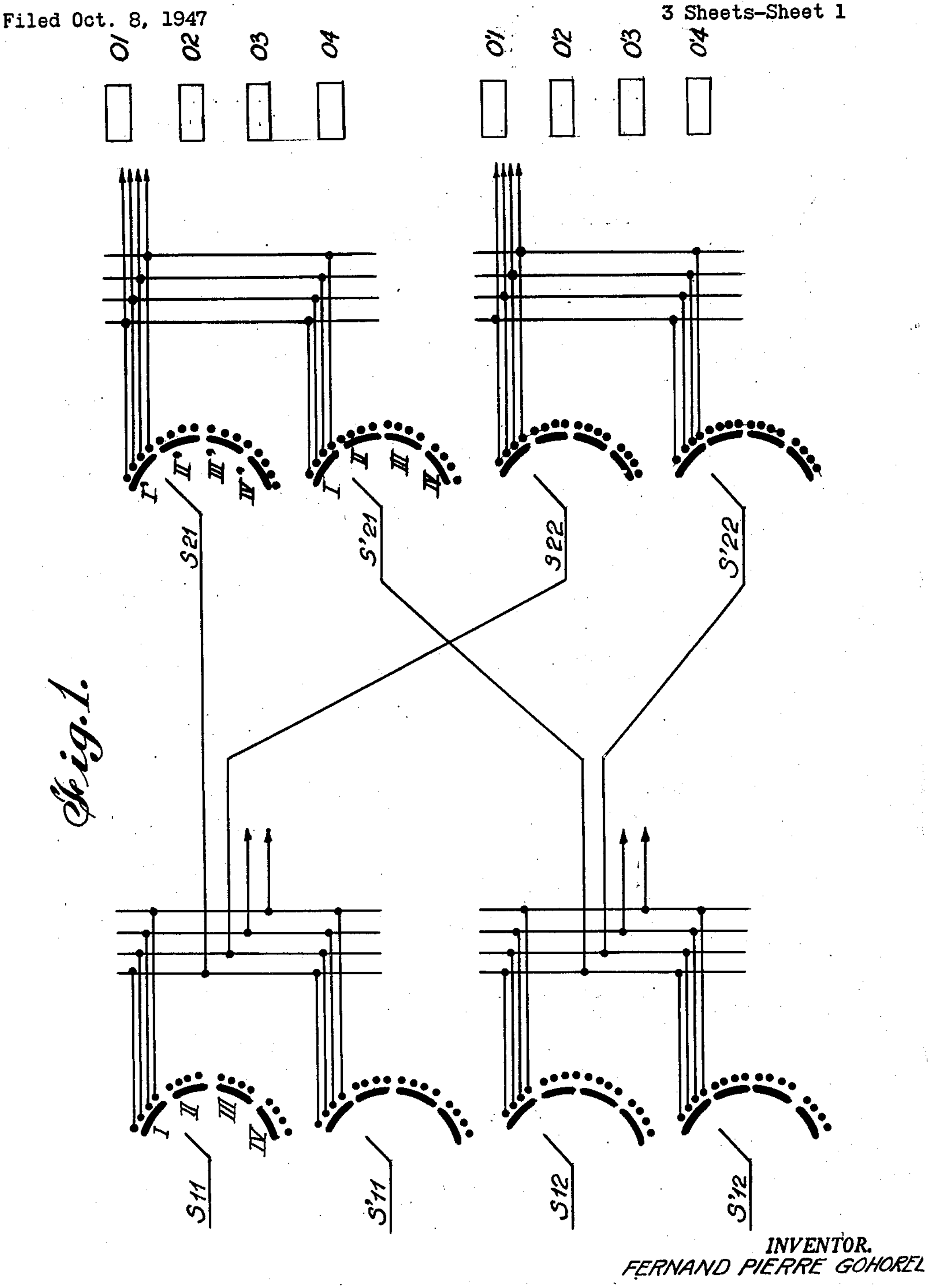

The present invention relates to automatic telephone systems. Its object is an arrangement of selectors that makes it possible to reduce the number of selection members necessary for handling a given amount of traffic.

There is a known means for increasing the traffic handling capacity of a certain number of members or lines when there are selectors available that have only a small number of outlets at each level. Use is made for this purpose of members frequently called secondary line switches.

Each group of selectors has access to a certain number $n$ of secondary line switches, the number being determined by that of the outlets of the respective level of the selectors. The secondary line switches associated with one same group of selectors are distributed in their turn into "secondary" groups. Each "secondary" group has itself access to $p$ lines, so that the selectors, by means of certain arrangements, finally have access to $np$ different lines. The traffic handling capacity of a group of $np$ lines made up in this way is much greater than that of $p$ independent groups of $n$ lines each.

One of the features of the present invention consists of a special arrangement of selectors in two successive stages, the selectors of the first stage having access to a certain level, and over groups of $n$ lines to the selectors of the second stage, these second selectors themselves having several levels and having access over these levels to $p$ lines. The selectors of the first stage receive the selective combination that has to permit the hunting of a line in a certain level of the second selectors, the effect of the said combination being to permit the first selector to be steered only to a second selector that has idle lines in the group determined by the selective combination, the said selective combination or any other suitable one being then transmitted to the second selector for its steering.

In this way, the said lines may be considered for calculation purposes as representing an almost perfect group of $np$ lines, $n$ being the number of lines at each level of the first selector, and $p$ being the number of lines at each level of the second selector.

Another feature of the present invention consists in employing, in an arrangement of selectors as mentioned in the above feature, an electric state or testing characteristic of the second selector by the first selector that is modifiable depending on the partial or total occupation of the various groups of lines to which the second selector has access, and in only permitting the steering of the first selector to a second selector whose testing characteristic indicates that the wanted group of lines is not completely occupied.

Another feature of the invention, when the second selector only has access to two groups of outgoing lines, consists in marking the availability of one of these groups by a positive potential (with respect to a reference 0), and that of the other by a negative potential (with respect to the same 0), and the availability of these two groups by an alternately positive and negative potential, and this at a frequency high enough for the action of the first selector's steering control devices to be sufficiently rapid to effect its steering in the desired time.

Another feature of the invention consists in providing as many simultaneous test circuits of the second selector by the first selector (e. g. by means of several wipers of a number equal to that of the groups of the second selector), only one of them being made effective in accordance with the selective combination received by the first selector, and each test circuit being placed at a different potential depending upon whether the group to which it belongs is completely occupied or not.

Another feature of the invention consists in providing for the employment of a single test circuit and of different frequency currents, or of frequency combinations of a number equal to that of the groups of lines to which the second selector has access, each of the said currents being applied to the test circuit by the second selector when the corresponding group is not completely occupied. The test circuit closes in the first selector across a filter that is adjusted so as to only permit passage of the frequency or the frequency combination that corresponds to the wanted group.

Another feature of the invention consists in controlling the steering of the second selector (after its hunting by the first selector) by means of potentials or currents characteristic of the wanted group of lines, the same being applied by the first selector and in accordance with the selective combination it has received.

Another feature of the invention, when there is a register in the originating office of the call, consists in controlling the steering of the second selector (after its hunting by the first selector) by means of a selective combination particular to this second selector that may either be different from or identical with the selective combination received by the first selector.

The idea of the invention will be seen from the following description given as an example without limitation.

Fig. 1 shows an arrangement of selectors according to the invention.

Selectors S11, S'11, S12, S'12 of the first selection stage are assumed to have four output levels which each comprise four lines that give access to the selectors of the second stage. They are distributed in two multipling groups.

Selectors S21, S'21, S22 and S'22 and four other switches, not shown, form the second stage. They are assumed to have four output levels, each comprising four outgoing lines, and they are distributed in four multipling groups (two not shown).

It can be seen that each level of the first selectors has access to four second selector groups comprising four lines at each level. Each incoming line of the first selectors accordingly has access to 16 outgoing lines of the second selectors.

To each of the groups of outgoing lines of the second selectors there are associated marking devices such as 01, 02, 03, 04, which serve for marking a fictitious occupation of the second selectors when all the lines of an outgoing group are occupied and when a first selector is hunting a line in the said group.

Figure 2:
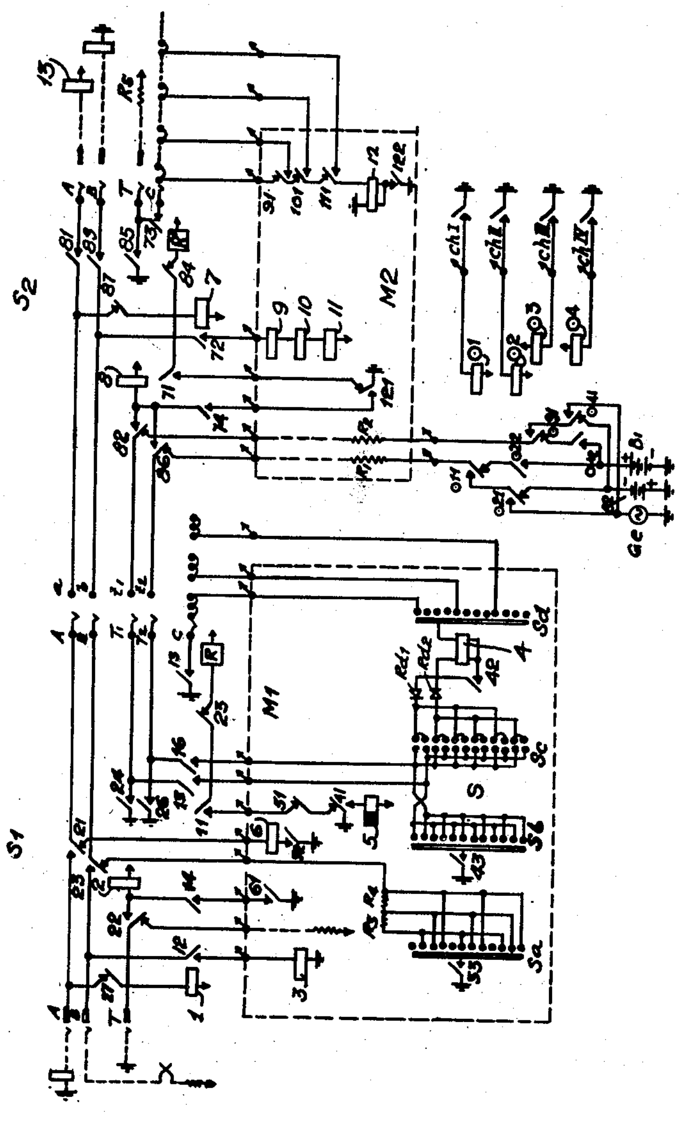

Fig. 2 is a schematic of an assembly of first and second selectors. Only the members necessary for understanding the invention are shown.

It is assumed that the second selectors comprise four groups of outgoing lines. The availability of the first two groups is indicated by a negative or positive polarity on wire $t2$ that is particular to each of them, or by an alternating polarity that is common to the two groups; the availability of the second two groups is indicated by a negative or positive polarity on wire $t1$ that is particular to each of them, or by an alternating polarity that is common to the two groups.

When at least one line is idle in the first group of outgoing lines and all the lines of the second group are busy, relay 01 is energized and relay 02 is in the resting position, and the negative polarity of battery B2 is applied to contact $t2$ of the bank associated with wiper T2 over: R021, T011, resistance R1 and R86.

When at least one line is idle in the second group and all those of the first group are busy, relay 02 is excited and relay 01 is in the resting position. The positive polarity of battery B1 is applied to bank contact $t2$ over: T022, R011, resistance R1 and R86.

When at least one line is idle in each of the first and the second groups, relays 01 and 02 are energized. The alternating polarity of generator Ge is applied to bank contact $t2$ over: T021, T011, resistance R1 and R86.

In similar manner, a negative, positive or alternating polarity is applied to bank contact $t1$ depending upon whether only relay 03 is energized, only relay 04 is energized or both relays 03 and 04 are energized.

When selector S1 is seized by a call, the various seizure operations take place by one of the known methods. Relay 1 pulls up and at T12 closes the circuit of impulse receiving relay 3. These impulses effect in marker M1 the steering of sequence switch S which, in the illustrated example, may take up one of the positions 1 to 12. It is assumed that the first selectors comprise three groups of outgoing lines, the steering being effected by the selective combinations 1 to 4 for the first group, the selective combinations 5 to 8 for the second group, and the selective combinations 9 to 12 for the third group.

It is assumed that sequence switch S has been steered to the first position and that there is at least one idle line in the first group of outgoing lines of the second selectors. A negative or alternating polarity is applied to $t2$.

The circuit of electromagnet R and of the wipers of selector S1 having been completed at T11, these wipers will advance until the moment when wiper T2 reaches contact $t2$. The circuit of stop relay 4 is completed over: ground, T13, wiper C, and one of the bank contacts that correspond to the first group of outgoing lines of the first selector, bank contact and wiper S$d$ of S, windings of relay 4 in series, rectifier R$d_1$, back contact and wiper Sc of S, T16, wiper T2 and negative polarity on $t2$.

At R41, relay 4 opens the circuit of electromagnet R, thus causing S1 to stop.

At T41, it completes the circuit of relay 5 which closes at T52 the circuit of relay 6 to the top wire A. At T43, relay 4 applies a ground across wiper S$b$ to testing wire T1, which is not used for the steering in the case in question, in order to mark the said testing wire busy and to prevent the stoppage of a second selector that would proceed to hunt in either the third or fourth group of lines.

Relay 7 of S2 becomes energized in series with relay 6 of S1. This latter does not become energized, owing to the high resistance of relay 7.

Selector S2 has now to be steered to an idle line in the group of lines that corresponds to the position of sequence switch S of marker M1.

For this purpose, arrangements are provided in association with the bank of wiper S$a$ of S, and depending on the orientation of S, for applying to the bottom wire B, when T53 is closed, either no ground, or a ground across a high value resistance $R3+R4$, or a ground across low value resistance R4, or a general ground, these various electric states characterizing the group of outgoing lines of the S2 selectors.

In the marker M2 of selector S2 there are provided three relays 9, 10 and 11, which are mounted in series and which have such characteristics that, according to the electric state of wire $b$, either none of them is energized, or only relay 9, or relays 9 and 10, or relays 9, 10 and 11.

In the case under consideration, when S of M1 stops at position 1, no ground is applied by S$a$ to the bottom wire B. The three relays 9, 10 and 11 of M2 will accordingly remain in the resting position, and stop relay 12 will remain connected to the pilot wire of the first group of outgoing lines.

When the circuit of rotating electromagnet R' of S2 is completed at T71, the wipers of S2 advance step by step. When they reach the bank contacts of an idle line, the following circuit is completed: battery, resistance R5, bank contact and wiper T, T73, wiper C, pilot wire, R91, R101, R111, series windings of relay 12, ground. Relay 12 becomes energized and at R121 it opens the circuit of R'. Selector S2 stops at the respective position. At T121, relay 12 completes through T74 the circuit of relay 8 which becomes energized, and at T122 it short-circuits its left-hand winding to mark the occupation.

When wiper A of S2 reaches an idle line, the circuit of relay 6 of S1 is completed over relay 13 of the next S2 selector. This relay 6 becomes energized and at T61 it completes T14 the circuit of relay 2, which becomes energized and closes at T22 its holding circuit on the testing wire over a ground in the preceding S1 selector. At R27, relay 2 opens the circuit of relay 1 which falls back and this releases marker M1; at T24 and T26 it applies a ground to test wires T1 and T2 in order to maintain the occupation and complete the holding circuit of relay 8 of S2; and at T21 and T23 it connects the talking circuit to selector S2.

Relay 8, which has become energized as mentioned above, completes at T82 and T86 its holding circuit; at R87, it opens the circuit of relay 7 which falls back and releases marker M2; at T81 and T83 it connects the talking circuit to the next selector.

The talking circuit is completed over selectors S1 and S2.

Upon termination of the call, the circuit of relay 2 is opened, and this effects the release of selector S1 and the opening of the circuit of relay 8 which falls back and releases selector S2.

The steering of selectors S1 and S2 for the various positions of S is done in the already described manner either over testing wire T1 or testing wire T2.

Figure 3:
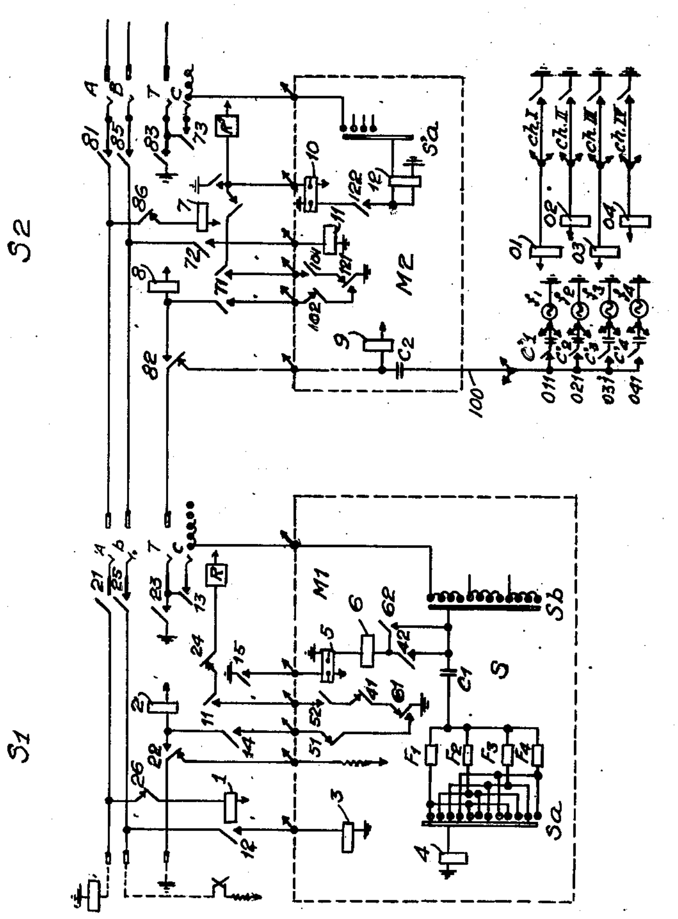

Fig. 3 shows a variant of the embodiment of Fig. 2 in which there is provided a frequency that is characteristic of each of the groups of lines outgoing from S2, this frequency being superposed on the availability potential of selector S2.

It is assumed that a frequency $f1$ is applied to wire 100 when at least one idle line is available in the first group, and frequencies $f2$ for the second group, $f3$ for the third and $f4$ for the fourth. These various frequencies may be applied simultaneously.

In marker M1 of S1, band-pass filters F1, F2, F3, F4 are disposed on the contact banks of wiper S*a*, and these filters permit passage of the respective frequency currents $f1$, $f2$, $f3$ and $f4$.

When sequence switch S is steered to the combination that corresponds to the wanted group, stop relay 4 is connected in series with the band-pass filter tuned to the frequency that characterizes the said group.

When the wipers of S1 reach an idle line, the circuit of relay 4 is completed: ground, winding of 4, one of the filters F1 to F4, condenser C1, segment S*b* and pilot wire, wiper C, T13, wiper T, R82, condenser C2 and one of the generators $f1$ to $f4$.

Relay 4 becomes energized and at T42 closes the circuit of relay 6 and of the right-hand winding of relay 5 which was already energized over T15 in its left-hand winding; and at R41 it opens the circuit of advancing electromagnet R, thus effecting the stoppage of S1 at the respective position.

At R61, relay 6 makes a second break in the circuit of R; at T62 it closes its holding circuit; and at T61 it prepares the circuit of relay 2, which is completed when relay 5 falls back, as its two windings are in opposition.

Relay 2 becomes energized; at T22 it closes its holding circuit over the preceding selector; at T21 and T25 it closes the talking circuit to selector S2; at T23 it applies a general ground to wiper T to mark the occupation; and at R26 it opens the circuit of relay 1 which falls back, releasing marker M1.

Selector S2 operates from then on as a selector of an already known type and it receives the selective combination on relay 11 directly from the register that controls the forwarding of the call.

It is to be noted that when the wipers of S1 pass over a busy line, stop relay 4 is short-circuited by the ground applied to the bank contacts of the said line, e. g. by contact T23.

I claim:

1. In an automatic telephone system in which a plurality of first and second selectors and outgoing trunks are provided and the access to said outgoing trunks is increased by distributing the trunks from a given level of the first selectors over groups of second selectors, each of which has access to different outgoing trunks at a given level, and in which means is provided for seizing one of said first selectors, the combination comprising a first marker adapted to be set in response to incoming pulses received by a seized first selector to register a called number, sources of signals, means controlled by the idle or busy condition of the outgoing trunks for applying signals from said sources to test terminals of said seized first selector, said signals indicating which groups of said outgoing trunks, available to said first selector through second selectors, have at least one idle outgoing trunk, means for starting a hunting operation of said first selector in response to the seizure thereof, means in said first marker responsive to said signals for causing said first selector to stop when the wipers thereof rest on terminals having access through a second selector to a desired group of outgoing trunks containing an idle outgoing trunk and thus to seize a second selector, a second marker connected to the thus selected terminals of said seized first selector, and means in said first marker and controlled by the setting thereof for causing said second marker to mark the desired group of trunks in the terminals of said seized second selector.

2. In an automatic telephone system, the combination according to claim 1, in which the trunks leading from first selectors have test terminals in the first selectors, and in which the means for applying to the terminals of the first selectors comprises a plurality of chain relays, one for each group of outgoing trunks from the second selectors, means for holding each of said relays operated until all the outgoing trunks of the corresponding group are busy, sources of signals, and means under control of said relays for connecting signals from said sources to the test terminals of the first selectors to indicate the condition of the second selectors.

3. In an automatic telephone system, the combination, according to claim 2, in which the means under control of the chain relays connect the signals to the test terminals of first selectors leading to second selectors in which there are idle outgoing trunks in a group and disconnect the signals from test terminals of first selectors leading to second selectors when the outgoing trunks of a group are completely occupied.

4. In an automatic telephone system, the combination according to claim 1, in which the first selectors have test wipers arranged to contact the test terminals of the trunks and each test wiper of the first selector is arranged to test two groups of second selectors, and in which the means for applying signals to the test terminals of the first selectors leading to one group of second selectors having an available idle trunk include means to apply a positive potential to said terminals, to apply a negative potential to the test leads of the other group of selectors having an available idle trunk, and to apply an alternating potential to the test leads of both groups of second selectors when they simultaneously have idle trunks.

5. In an automatic telephone system, the combination, according to claim 1, in which the means for causing the second marker to mark the desired group of trunks comprises a plurality of relays in said second marker connected in series and to said first marker through said first selector and having different marginal operating voltage values whereby they are arranged for selective operation by said first marker dependent on the voltage applied therefrom, and a control relay in said second marker for controlling the second selector in selecting the marked group.

6. In an automatic telephone system, the combination, according to claim 1, in which the first selectors have wipers and the first marker includes a relay and two rectifiers, the rectifiers being connected in parallel and in series with the winding of said relay, the operating circuit of said relay being connected to a wiper of each of said first selectors, whereby a marking potential applied to a terminal of one of said first selectors will operate said relay, and means for stopping said selector when said relay operates.

7. In an automatic telephone system, the combination, according to claim 1, in which is further provided a plurality of sources of alternating potentials of different frequencies, and in which the means for applying signals indicating the groups containing idle trunks comprises a plurality of chain relays, means for causing said relays to mark the terminals of the idle second selectors having access to trunk groups having at least one idle trunk by connecting thereto an alternating potential of a given frequency from one of said sources, there being a given frequency or combination of frequencies for each group of trunks to which the second selector has access.

8. In an automatic telephone system, the combination, according to claim 7, in which test wipers are provided for said first selectors and the first marker is provided with a test relay, a sequence switch connected in the circuit thereof, and a plurality of filter networks connected to terminals of said sequence switch, said filter networks being selective of the frequencies peculiar to the different groups of trunks, the other end of said networks being connected to a test wiper of the first selector, whereby said test relay is operated when said sequence switch connects said relay to a filter network which permits the passage of the particular frequency from the terminal of said selector with which said wiper is then in contact.

9. A two-stage selector comprising a first stage switch, a plurality of second stage switches available to said first stage switch and having outlets in a number of directions, means connected to the outlets of the switches of the second stage to feed back to said first stage switch electrical test characteristics indicative of the idle or busy condition of each of the various groups of outlets therefrom, means connected to said first stage switch and responsive to a selective signal or signal combination for determining from said fed back electrical test characteristics the busy or idle condition of the particular group of outlets from the second stage corresponding to said selective signal or signal combination, and means controlled by said last-mentioned means for causing said first stage switch to select an idle second stage switch having an idle outlet in said particular group of outlets.

10. A two-stage selector, as claimed in claim 9, in which the means responsive to a selective signal or signal combination comprises a marker device adapted to be set in response to a selective signal or signal combination and to mark a wanted group of outlets from the first stage and to control the selection of a second stage switch having an idle outlet in a desired one of a number of directions.

11. In an automatic telephone system, the combination, according to claim 1, further comprising means for causing the second selector to start hunting for the marked group of trunks upon the seizure of said second selector, and means for stopping said second selector when an idle trunk in the marked group is reached.

FERNAND P. GOHOREL.

References Cited in the file of this patent

UNITED STATES PATENTS

| Number | Name | Date |
|---|---|---|
| 1,625,425 | Pracht | Apr. 19, 1927 |
| 1,757,446 | Wright | May 6, 1930 |
| 1,900,969 | Wright | Mar. 14, 1933 |
| 2,238,223 | Kozma | Apr. 14, 1941 |
| 2,249,449 | Wicks | July 15, 1941 |
| 2,326,478 | Meacham | Aug. 10, 1943 |
| 2,354,682 | Herbig | Aug. 1, 1944 |
| 2,416,086 | Christian | Feb. 18, 1947 |
| 2,424,585 | Simon | July 29, 1947 |